United States Patent [19]
Sakurai

[11] Patent Number: 4,533,959
[45] Date of Patent: Aug. 6, 1985

[54] PICTURE PROCESSING APPARATUS

[75] Inventor: Akira Sakurai, Kawasaki, Japan

[73] Assignee: Ricoh Company, Ltd., Tokyo, Japan

[21] Appl. No.: 442,718

[22] Filed: Nov. 18, 1982

[30] Foreign Application Priority Data

Nov. 19, 1981 [JP] Japan .................. 56-186052

[51] Int. Cl.³ .............................. H04N 1/40
[52] U.S. Cl. .................... 358/280; 382/46; 382/61
[58] Field of Search .......... 382/61, 46; 358/280, 358/285

[56] References Cited

U.S. PATENT DOCUMENTS

| | | | |
|---|---|---|---|
| 3,337,766 | 8/1967 | Malaby | 382/61 |
| 3,830,975 | 8/1974 | Potter | 358/285 |
| 3,885,229 | 5/1975 | Negita | 382/61 |
| 4,393,410 | 7/1983 | Ridge | 358/285 |

*Primary Examiner*—Howard W. Britton

*Attorney, Agent, or Firm*—Oblon, Fisher, Spivak, McClelland & Maier

[57] ABSTRACT

A picture processing apparatus comprising (1) a picture memory for storing a quantized picture of an original, which original includes skew detection marks, (2) a skew detector for detecting the skew of the quantized picture by the skew detection marks on the original, (3) a frame detector for detecting the frame in which the picture on the original is enclosed, (4) a picture-processing area designation apparatus for designating the portion of the picture to be processed and edited in accordance with the frame detection information obtained from the frame detector, (5) a skew corrector for reproducing the quantized picture within the area designated by the picture-processing area designation apparatus, with correction of skew (if any), from the picture memory, and (6) a skew mode selection switch for the skew corrector for selecting whether or not the aforementioned skew correction shall be performed.

4 Claims, 22 Drawing Figures

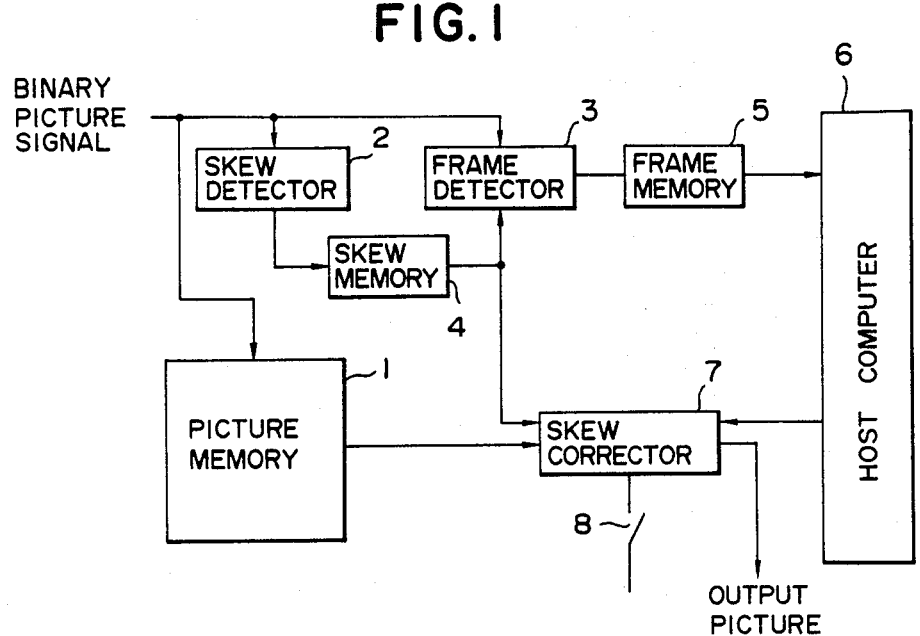
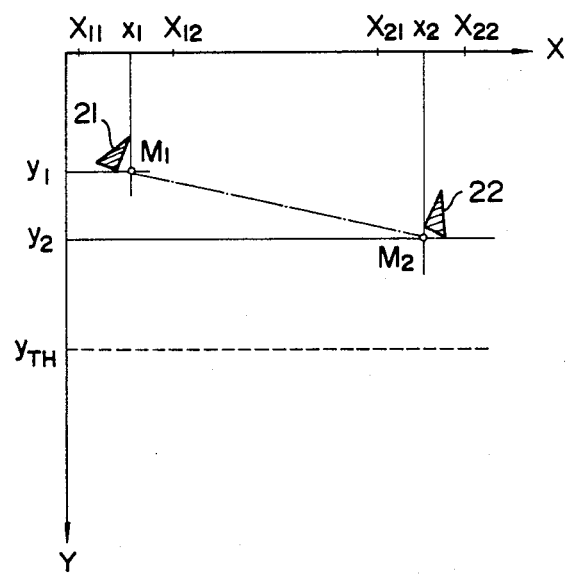

N > 0

N < 0

PICTURE PROCESSING APPARATUS

BACKGROUND OF THE INVENTION

1. Field of the Invention

The present invention relates to a picture processing apparatus capable of processing and editing quantized pictures which are obtained by scanning original pictures with a scanner.

2. Description of the Prior Art

When information slips or the like containing original pictures (i.e., images, data, etc.) are subjected to automatic reading and the quantized pictures obtained by that reading are edited or processed, it is obviously important that the original picture to be read be accurately detected and reproduced without distortion. So long as the slips are inserted with the normal posture (i.e., without skew) into an automatic reading apparatus, and assuming all else functions as intended, the picture can be reproduced without distortion. However, when the slips are inserted with skew into the automatic reading apparatus, it is inevitable that the reproduced picture will be distorted.

Conventionally, in order to provide a solution to this problem, there has been proposed a picture processing apparatus capable of detecting the skew of slips, if any, by detecting the orientation of the original picture, correcting the quantized picture in accordance with the detected skew, and reproducing the images. In the case of this conventional picture processing apparatus, however, there are circumstances under which skewing of a slip can be erroneously determined, for instance, due to the presence of some dark or smeared portions in the slip, and "correction" of the quantized picture of the slip in accordance with the erroneously detected skew itself results in reproduction of a distorted picture. When this takes place, it is no longer possible to correct the distorted picture to an undistorted picture.

Furthermore, conventionally there has been proposed a picture processing apparatus capable of correcting quantized pictures by detecting the orientation of a frame in which each picture appears. However, in the case of this conventional picture processing apparatus, it is extremely difficult to detect skewing, and to reproduce a picture with the skew corrected, when the frame is formed by broken lines, chain lines, or hand-written, not-perfectly-straight lines.

SUMMARY OF THE INVENTION

It is therefore an object of the present invention to provide a picture processing apparatus capable of reproducing undistorted pictures correctly from picture-bearing slips even if the slips are inserted with skew into the picture processing apparatus.

The picture processing apparatus according to the present invention comprises (1) a picture memory for storing a quantized picture of an original, which original includes skew detection marks, (2) a skew detector for detecting the skew of the quantized picture by the skew detection marks on the original, (3) a frame detector for detecting the frame in which the picture on the original is enclosed, (4) a picture-processing area designation apparatus for designating the portion of the picture to be processed and edited in accordance with the frame detection information obtained from the frame detector, (5) a skew corrector for reproducing the quantized picture within the area designated by the picture-processing area designation apparatus, with correction of skew (if any), from the picture memory, and (6) a skew mode selection switch for the skew corrector for selecting whether or not the aforementioned skew correction shall be performed.

According to the present invention, the original quantized picture is stored in the picture memory, and the skew of the quantized picture and the frame surrounding the quantized picture are detected independently. By the skew mode selection switch, the choice as to whether or not skew correction for the quantized picture is to be performed can be made. Therefore, even if the skew of the quantized picture is somehow detected erroneously, and the quantized picture is not skewed in fact, the original picture is not lost. Rather, an undistorted picture can still be reproduced from the picture memory by turning off the skew mode selection switch, since the original quantized picture is stored in the picture memory and can be reproduced therefrom as many times as desired.

BRIEF DESCRIPTION OF THE DRAWINGS

In the drawings,

FIG. 1 is a block diagram showing the outline of an embodiment of a picture processing apparatus according to the present invention.

FIG. 2 is a schematic illustration in explanation of an algorithm for detection of the skew of an original for use in the embodiment of a picture processing apparatus according to the present invention shown in FIG. 1.

DETAILED DESCRIPTION OF THE PREFERRED EMBODIMENTS

Figure 3:
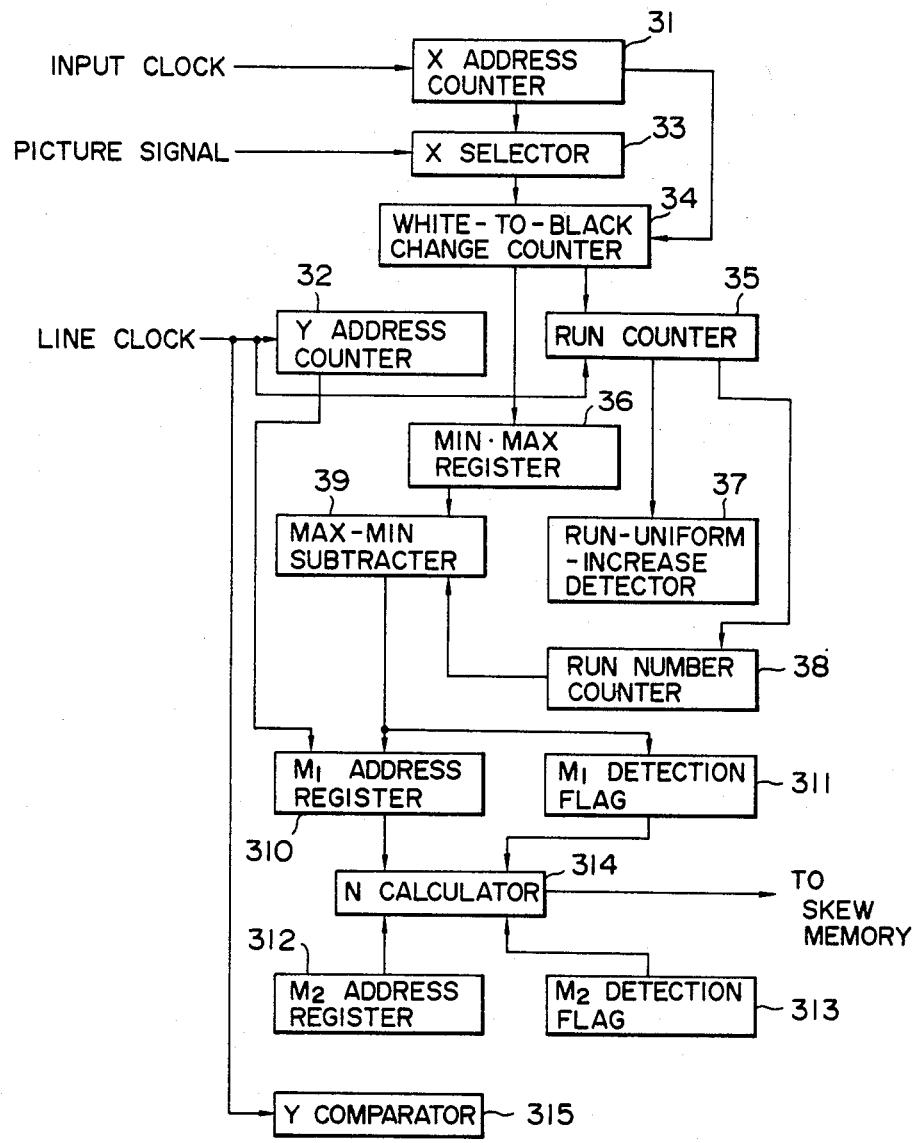
FIG. 3 is a block diagram of a skew detector for use in the present invention.

Referring to FIG. 1, the outline of an embodiment of a picture processing apparatus according to the present invention will now be explained.

Binary picture signals which are obtained by scanning the picture of an original and quantizing the picture elements thereof are directly input to a picture memory 1 and stored therein. At the same time, those binary picture signals are input to a skew detector 2 and a frame detector 3. Skew information detected by the skew detector 2 is stored in a skew memory 4. By the frame detector 3, a frame surrounding the quantized pictures is detected. Thereafter, the frame information is stored in a frame memory 5 and is then input to a host computer 6 by which an area of the picture to be processed and edited is designated in accordance with the just mentioned frame information. A skew corrector 7 reads from the picture memory 1 the quantized picture information within the area designated by the host computer 6, corrects the quantized picture information in accordance with the skew information stored in the skew memory 4 and outputs the image information, when a skew mode selection switch 8 is on. When the skew mode selection switch 8 is off, the picture information is output from the skew corrector 7 without the above-mentioned skew correction.

Referring to FIG. 2 and FIG. 3, detection of the skew of a picture-bearing slip in the present invention will now be explained in more detail.

(1) Skew Detection

An algorithm of skew detection by use of the skew detector 2 (refer to FIG. 1) will be explained by referring to FIGS. 2 and 3.

In the present invention, for example, a picture-bearing slip with two triangular solid black marks 21 and 22 for skew correction as shown in FIG. 2 is employed.

(i) Detection of Skew Marks (Step 1)

For detection of those skew marks 21 and 22, the black picture elements are counted by scanning in a range $X_{11}$ to $X_{12}$ and a range $X_{21}$ to $X_{22}$ where the marks 21 and 22 are possibly present.

(Step 2)

In the case where the above-mentioned triangular skew marks are employed, when, during the scanning in the just mentioned Step 1, a predetermined number of lines, for instance, 30 to 50 lines, of a predetermined number or more of black picture elements, for instance 5 black picture elements, are continuously counted, which together define the approximate size of each mark, one of the following two conclusions is drawn:

When the number of black picture elements in each line successively increases uniformly, it is judged that a skew mark is present. In this case, if, during a general overall uniform increase in the number of picture elements, the number of picture elements in each lines does not increases on a limited, predetermined number of occasions during scanning (say, at two or three lines), such failure to increase is ignored on the assumption that it was caused by some noise.

When the number of picture elements in successive lines does not increase uniformly, it is judged that a skew mark is not present.

(ii) Skew Detection

The coordinates $(x_1, y_1)$ of a reference point $M_1$ of the skew mark 21 and the coordinates $(x_2, y_2)$ of a reference point $M_2$ of the skew mark 22 are determined. Referring to FIG. 2, the x coordinate of the rightmost point of the skew mark 21 is $x_1$, while the y coordinate of the lowermost point of the skew mark 21 is $y_1$. Likewise, the x coordinate of the leftmost point of the skew mark 22 is $x_2$, while the y coordinate of the lowermost point of the skew mark 22 is $y_2$.

In this case, the skew angle of a slip with the above mentioned skew marks is represented by the following formula:

$$\tan^{-1}\left(\frac{y_1 - y_2}{x_2 - x_1}\right)$$

Since, in this embodiment, skew correction is performed by the N:1 scanning method, which will be explained in detail later, N is obtained from the following equation:

$$N = \frac{x_2 - x_1}{y_2 - y_1}$$

In the above equation, when $y_1 = y_2$, there is no skew.

Referring to FIG. 3, there is shown a block diagram of the skew detector 2 (refer to FIG. 1).

In the figure, an X address counter 31 and a Y address counter 32 are respectively an address counter for the X direction and an address counter for the Y direction. The X address counter 31 and the Y address counter are respectively caused to count up by an input clock and a line clock. An X selector 33 transmits picture signals to a white-to-black change detector 34 only when the detected X address is within the the range of $X_{11}$ to $X_{12}$. Upon reception of the picture signals, the white-to-black change detector 34 first detects the change in image density from white to black and transmits signals to a run counter 35 until a change in image density from black to white is thereafter detected. The X address at the time of the change in image density from white to black, and the X address at the time of the change in image density from black to white, are each input to a MIN MAX register 36 and are stored therein. The run counter 35 counts the signals output from the white-to-black detector 34, and, when a line clock is input to the run counter 35, the run counter 35 outputs the number of the counted signals to both a run-uniform-increase detector 37 and a run number counter 38. Upon reception of signals indicating the number of the counted signals from the run counter 35, the run-uniform-increase detector 37 determines from the received signals whether or not the number of picture elements in successive lines increases uniformly in accordance with the previously described algorithm of skew detection.

When it is determined that the number of picture elements in successive lines does not increase, the just above explained steps are initialized, except the operations of the X address counter 31 and the Y address counter 32.

When the contents of the run number counter 38 amount to a predetermined value (for instance, 5) or more, the run number counter 38 is caused to count up. When the contents of the run number counter 38 thereafter decrease below a predetermined value and the total line run number by that time amounts to a predetermined number which indicates the size of a skew mark, for instance, 30 to 50, the run number counter 38 outputs an OK signal to a MAX - MIN subtracter 39. However, in the case where the total run number does not amount to the predetermined number of lines indicating the size of the skew mark, the just explained steps are initialized, except the operations of the X address counter 31 and the Y address counter 32.

When the run number counter 38 outputs the OK signal to the MAX - MIN subtracter 39, the MAX - MIN subtracter 39 calculates the difference between the maximum X address (hereafter referred to as the MAX) and the minimum X address (hereafter referred to as the MIN) by subtracting the MIN from the MAX, that is, MAX - MIN. When the value of MAX - MIN indicates the size of the mark 21 (refer to FIG. 2), then the Y address (i.e., $y_1$ in FIG. 2) and the X address, MAX (i.e., $x_1$ in FIG. 2), of the mark 21 are input to an $M_1$ address register 310. As a result, the address of the reference point $M_1$ ($x_1$, $y_1$) of the mark 21 is stored in the $M_1$ address register 310, so that a $M_1$ detection flag 311 is set at 1.

Likewise, the address of the reference point $M_2$ ($x_2$, $y_2$) of the mark 22 is stored in the $M_2$ address register 312, so that an $M_2$ detection flag 313 is set at 1.

When both the $M_1$ detection flag 311 and the $M_2$ detection flag 313 are set at 1, an N calculator 314 calculates N in accordance with the previously described formula (i.e., $N=(x_2-x_1)/(y_2-y_1)$) by use of the X addresses and Y addresses obtained from the $M_1$ address register 310 and the $M_2$ address register 312, whereby the positive or negative sign of N, and the absolute value of N, that is, $|N|$, are input to the skew memory 4 (refer to FIG. 1).

Referring back to FIG. 3, a Y comparator 315 determines omission of the above described skew detection process when the Y addresses of the marks 21 and 22 are not detected as far as a certain limit line $Y_{TH}$ (refer to FIG. 2).

(2) Skew Correction

(i) Algorithm of Skew Correction

An algorithm of skew correction by use of the skew corrector 7 (refer to FIG. 1) will be explained by referring to FIGS. 4a and 4b and FIG. 5, which alogrithm is referred to as the N:1 scanning.

(a) When $|N| \geq N_{TH}$ (where $N_{TH}$ is the threshold value of the skew):

For instance, when $|N|$ is greater than the $N_{TH}$ of 500, it is regarded that substantially there is no skew. For example, when $|N|=500$, the skew angle is approximately 0.11 degree.

Figure 4A:
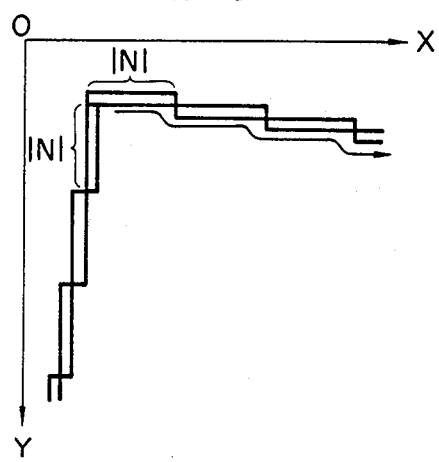
FIGS. 4a and 4b are schematic illustrations in explanation of an algorithm for skew correction for use in the present invention.

(b) When $|N| < N_{TH}$:

When N is positive, the scanning is performed in a modified zig-zag pattern as illustrated in FIG. 4a. More specifically, for each conventional "line" of scanning, scanning is performed over N picture elements in the direction of the X axis, followed by scanning of one picture element in the Y direction, followed by further scanning of N picture elements in the X direction, and so forth to the end of the line. With respect to the starting point for the scanning of each subsequent line, scanning begins at the same X coordinate, but offset one picture element in the Y direction, for each subsequent line, until lines beginning along the length of N picture elements in the Y direction have been scannned. At that point, scanning of the next line begins one picture element in the Y direction lower, as before, but also offset one picture element in the direction opposite to the direction of the X axis. That new X coordinate for the scanning starting points (i.e., one picture element opposite to the direction of the X axis, as compared with the initial scanning starting point) is maintained until lines along a further length of N picture elements in the Y direction have been scanned, whereupon the next line starting point is offset another one picture element in the direction opposite to the direction of the X axis, and so forth.

Figure 4B:
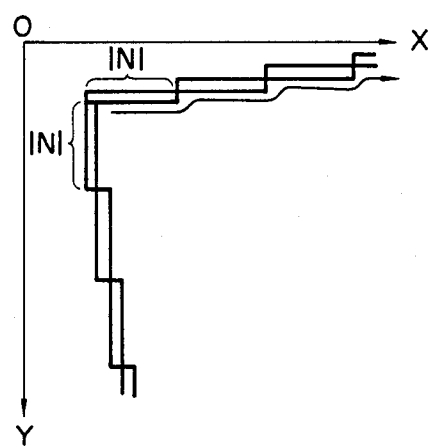

When N is negative, the scanning is performed in a modified zig-zag pattern as illustrated in FIG. 4b. More specifically, for each conventional "line" of scanning, scanning is performed over N picture elements in the direction of the X axis, followed by scanning of one picture element in the direction opposite to the direction of the Y axis, followed by further scanning of N picture elements in the X direction, and so forth to the end of the line. With respect to the starting point for the scanning of each subsequent line, scanning begins at the same X coordinate, by offset one picture element in the Y direction, for each subsequent line, until lines beginning along the length of N picture elements in the Y direction have been scanned. At that point, scanning of the next line begins one picture element in the Y direction lower, as before, but also offset one picture element in the X direction. The new X coordinate for the scanning starting points (i.e., one picture element in the X direction as compared with the initial scanning starting point) is maintained until lines along a further length of N picture elements in the Y direction have been scanned, whereupon the next line starting point is offset another one picture element in the X direction, and so forth.

(ii) Block Diagram of Skew Corrector

Figure 5:
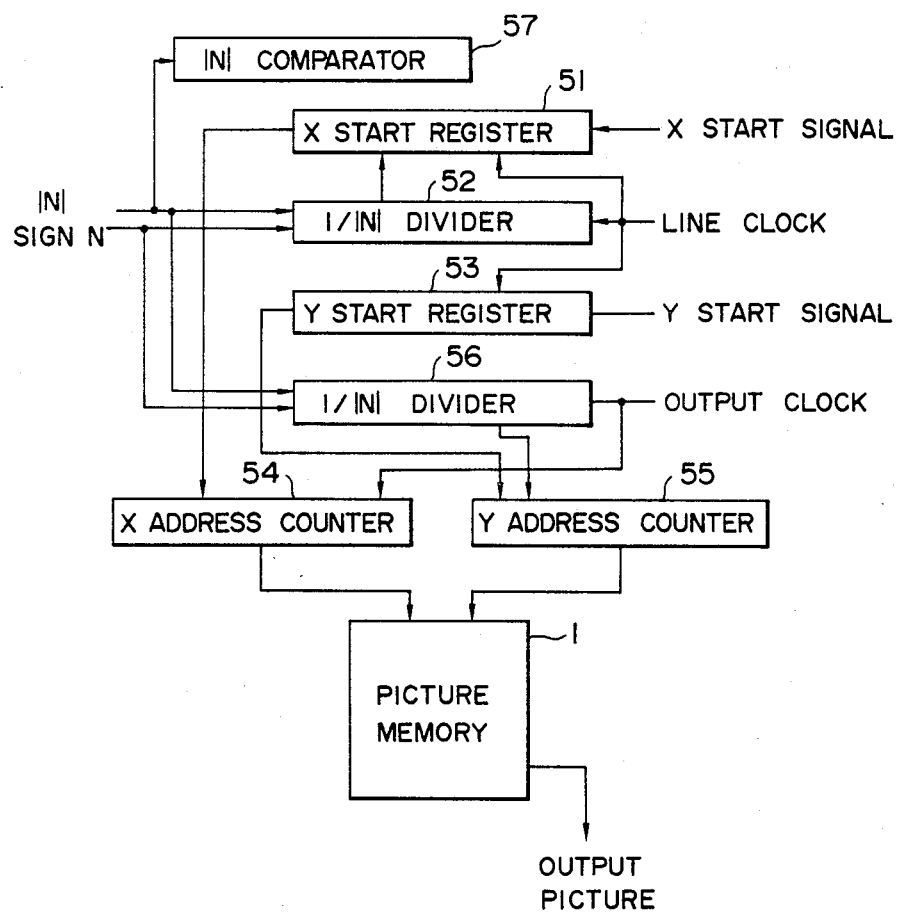
FIG. 5 is a block diagram of a skew corrector for use in the present invention.

Referring to FIG. 5, there is shown a block diagram of the skew corrector 7 (refer to FIG. 1). In the figure, an X start register 51 reads an X start signal output from the host computer 6 (refer to FIG. 1). The X start register 51 is caused to count down (when N is positive) or count up (when N is negative) by line clock signals which are subjected to N division by a $1/|N|$ divider 52. A Y start register 53 reads a Y start signal output from the host computer 6 and is caused to count up by each line clock input thereto.

The signals output from the X start register 51 and the signals from the Y start register 53 are respectively input to an X address counter 54 and to a Y address counter 55 when line clocks are input to the X start register 51 and the signals from the Y start register 53. The X address counter 54 receives the signal from the X start register 51 at the time of input of the line clock, and is caused to count up, for instance, by a picture output clock from the host computer 6.

The Y address counter 55 receives the signal from the Y start register 53 and is caused to count up (when N is positive) and count down (when N is negative) by the output clocks subjected to N division by a $1/|N|$ divider 56.

In accordance with the data stored in the X address counter 54 and in the Y address counter 55, the stored picture is output from the picture memory 1.

In FIG. 5, an $|N|$ comparator 57 serves to cause the stored picture to be output from the picture memory 1 without performing skew correction when $|N|$ exceeds the above described threshold value $N_{TH}$.

(3) Frame Detection

An algorithm of frame detection by use of the frame detector 3 will now be explained by referring to FIG. 6 through FIG. 11.

(3)-1 Sampling of Long Line Segments in the Main Scanning Direction

(i) Sampling of Line Segments in the Main Scanning Direction

Figure 6A:
FIGS. 6a, 6b, 6c and 6d and FIGS. 7a, 7b and 7c are schematic illustrations in explanation of an algorithm for frame detection for use in the present invention.

Referring to FIG. 6a, when, of a watched picture element and the picture elements above and below the watched picture element, two or more picture elements are black picture elements and such combinations of the picture elements are aligned continuously by the number l, (for example, l=40 to 70), the alignment of such picture elements is sampled as a long line segment, and the coordinates of the leftmost end and rightmost end of the sampled line segment, that is, (XS, XE), are stored in a line segment memory 811 (refer to FIG. 8).

(ii) Integration of Line Segments

Figure 6B:
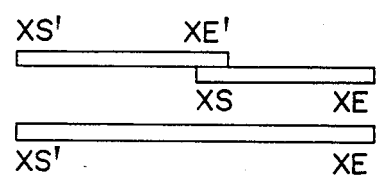

Referring to FIG. 6b, when, for example, the X coordinates of a preceding scanning line segment are (XS', XE'), and the X coordinates of the following scanning line segment are (XS, XE), if one of the following conditions is satisfied, the two scanning line segments are integrated into one integrated line segment:

$$XS < XE' < XE \quad (a)$$

$$XS < XS' < XE \quad (b)$$

The X coordinates of the integrated line segment are (MIN(XS', XS), MAX(XE', XE)), where MIN(XS', XS) means the smallest of the XS' and XS, and MAX(XE', XE) means the smallest of the XE' and EX.

(iii) Determination of Length of Line Segment

Referring to FIG. 6b, when there is no line segment to be integrated and the X coordinates of a scanning line segment are (XS', XE'), if $XE' - XS' \geq L_{TH}$, that scanning line segment are sampled as a long line segment, where $L_{TH}$ is the minimum length of the long line segment. When the just mentioned condition is not satisfied, the scanning line segment is not sampled. In the above, $L_{TH}$ is set, for example, at 155 in the case where 160 picture elements are present in 2 cm.

Figure 8A:
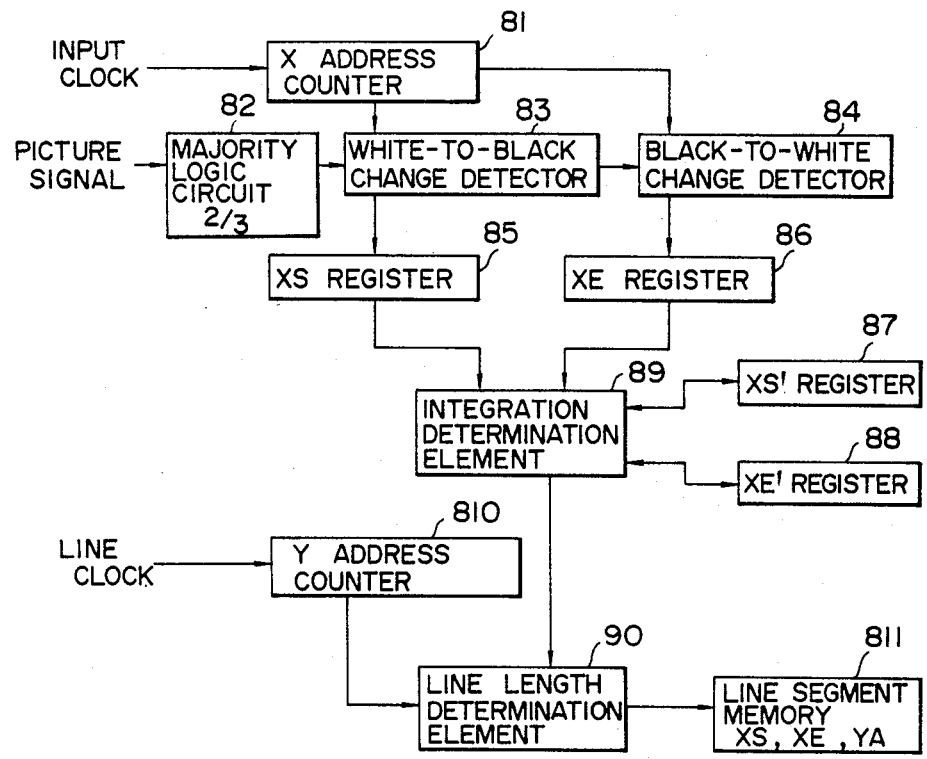
FIGS. 8a and 8b, FIG. 9 and FIG. 10 are block diagrams of a frame detector for use in the present invention.

When the long line segment line has been sampled, the X address of the long line segment and the Y address thereof (YA) are stored in the line segment memory 811 (refer to FIG. 8a). As a result, the contents of the line segment memory 811 are (XS, XE, YA). YA is represented by the following equation: $YA = Y - 2$, where Y is the current Y address after the above-mentioned storing.

(3)-2 Sampling of Long Line Segments in the Subscanning Direction

(i) Sampling of Line Segments in the Subscanning Direction

Figure 6C:
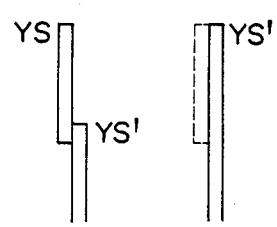

Referring to FIG. 6c, when, of a watched picture element and the picture elements on both sides of the watched picture element, two or more picture elements are black, the watched picture element is regarded as a black picture element and is stored as 1 in a YS memory 95 (refer to FIG. 9), and when, of the above three picture elements, one is black, or no picture elements are black, the watched picture element is regarded as white and is stored as 0 in the YS memory 95.

Figure 9:
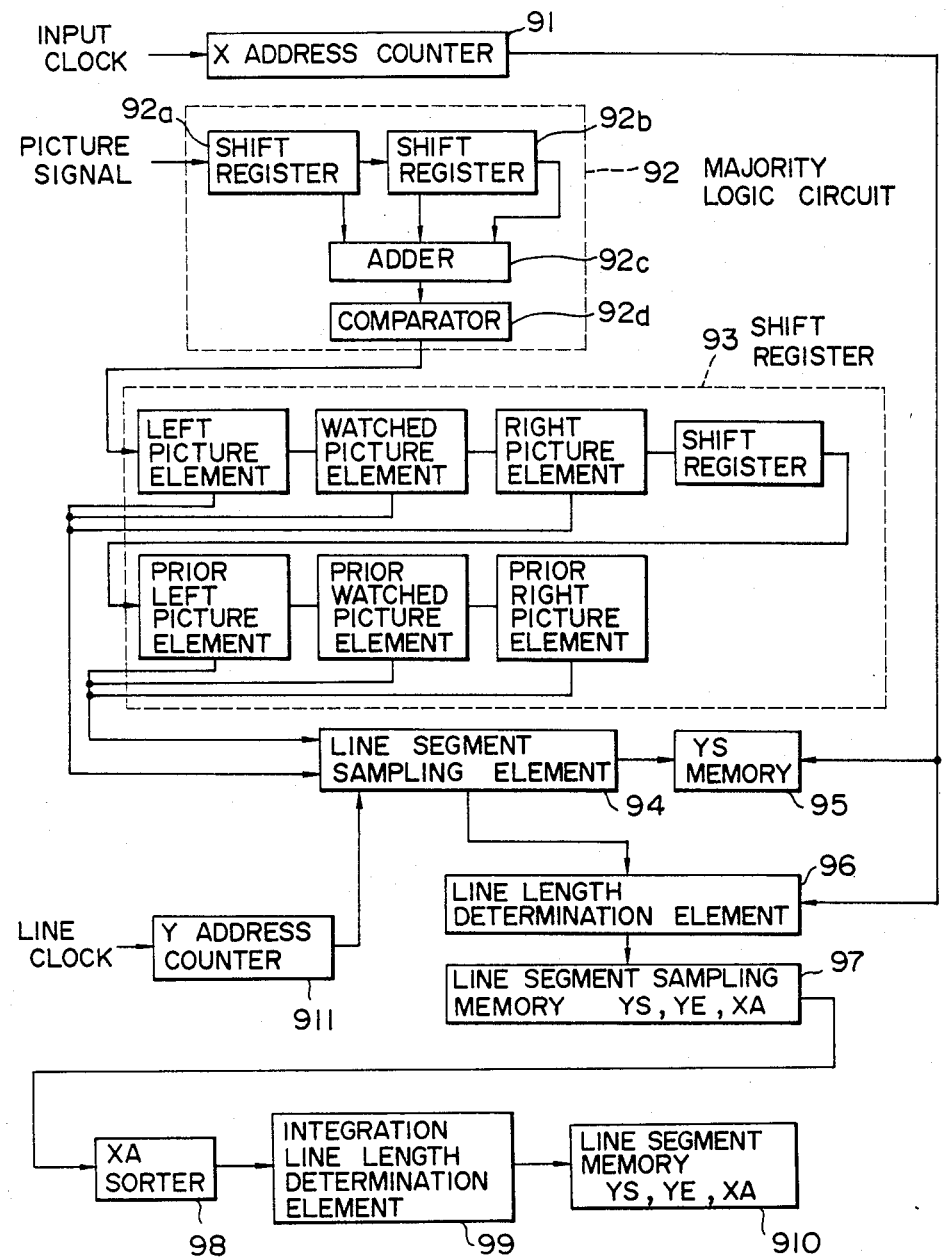

In accordance with this algorithm, the preceding scanning line segment and the watched scanning line segment are processed as follows:

a. When the watched picture element in the preceding scanning line segment is 0 (i.e., white), and the watched picture element in the watched scanning line segment is 1 (i.e., black):

YS is stored as the Y address in the YS memory 95 (refer to FIG. 9) at a position for the contents of an X address counter 91 (refer to FIG. 9).

b. When the watched picture element in the preceding scanning line segment is 1, and the watched picture element in the watched scanning line segment is 0:

In both the preceding scanning line and the watched scanning line, if one of the picture elements on either side of each watched picture segment is 1, YS' is stored in the YS memory 95 at the address (XA'), where YS' = MIN(YS', YS). In other cases, if a line segment satisfies the condition of $YE - YS \geq l_2$ (where YE is an end information and is YA−1, and $l_2$ is the minimum length of a line segment to be sampled in the direction of the Y axis, and $l_2$ is, for example, 30 to 50.), that line is sampled as a long line segment, and (YS, YE, XA) is stored in a line segment sampling memory 97 (refer to FIG. 9).

c. When the watched picture element in the preceding scanning line segment is 0, and the watched picture in the watched scanning line segment is 0:

Nothing is done.

d. When the watched picture element in the preceding scanning line segment is 1, and the watched picture in the watched scanning line segment is 1:

Nothing is done.

Figure 6D:
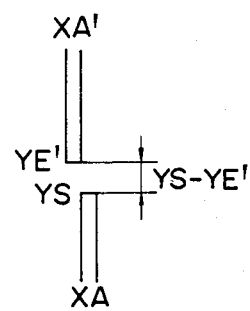

(ii) Integration of Line Segments (Refer to FIG. 6d)

Since there is the risk that line segments in the subscanning direction are broken, for instance, by white streak noise, the following processing is performed.

a. Sampled line segments are aligned in the order of the line segments with smaller X coordinates XA.

b. Line segments are integrated when $|XA - XA'| \leq 1$, and $YS - YE' < m$, where m is, for example 5.

c. When the length of a line segment is not less than the minimum length $L_{2TH}$, that line segment is sampled as a long line segment. The minimum length $L_{2TH}$ is, for example, 75.

Figure 7A:
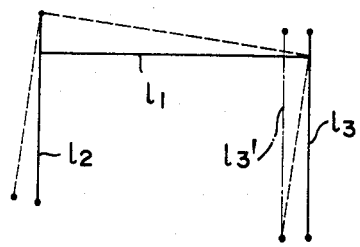
Figure 7B:
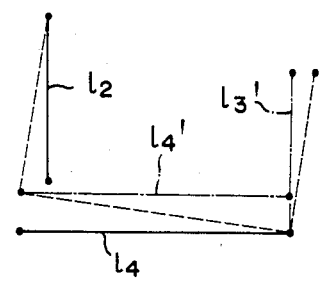
Figure 7C:
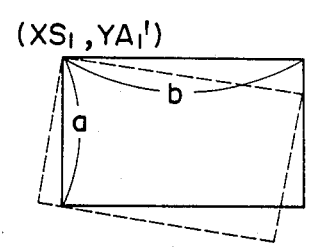

(3)-3 Detection of Frame (Refer to FIGS. 7a through 7c)

(i) With respect to a line segment $l_1$ (XS$_1$, XE$_1$, XA$_1$) in the main scanning direction, it is checked whether or not (1) a line segment $l_2$ (YS$_2$, YE$_2$, XA$_2$) and (2) a line segment $l_3$ (YS$_3$, YE$_3$, XA$_3$) are present, which cross the above mentioned line segment $l_1$ (XS$_1$, XE$_1$, XA$_1$) or which start from the vicinity within R picture elements of the line segment $l_1$ (XS$_1$, XE$_1$, XA$_1$) (where R is, for example, 15). The presence of the line segment $l_3$ is determined by use of $l_3'$ (YS$_3$, YE$_3$, XA$_3'$), with the skewing of the frame taken into consideration, where XA$_3'$ is represented by the following equation:

$$XA_3' \times XA_3 - (YE_3 - YS_3) \times 1/N$$

The conditions for the presence of the above described line segments $l_2$ and $l_3$ are as follows:

(ii) It is determined whether or not there is a line segment $l_4$ (XS$_4$, XE$_4$, YA$_4$) directed in the main scanning direction, which crosses both the line segments $l_2$ and $l_3'$, or which is present within the area of R picture elements from the line segments l$_2$ and l$_3$. As in the case of the above described line segment l$_3$, the presence of the line segment l$_4$ is determined by use of the line segment l$_4$'(XS$_4$, XE$_4$, YA$_4$'), with skewing of the frame taken into consideration, where XA$'_4$ is represented by the following equation:

$$XA_4' = XA_4 - (XE_4 - XS_4) \times |1/N|$$

The conditions for the presence of the above described line segment are as follows:

$$\begin{cases} YA_4' \leq YE_2 + R \\ YA_4' \leq YE_3 + R \\ XS_4 - R \leq XA_2 \\ XA_3' \leq XE_4 + R \end{cases}$$

(iii) When the above-described conditions (i) and (ii) are positively satisfied, the frame can be detected to be [(XS$_1$, XA$_1$'), a, b], where $$YA_1' = YA_1 - (XE_1 - XS_1) \times |1/N|$$

$$a = XA_4 - YA_1$$

$$b = XA_3 - XA_2$$

When the frame is extremely small, for instance, a≦75 or b≦155, the detected frame is discarded.

The picture within the frame can be obtained by scanning b picture elements in one scanning process, starting with the point (XS$_1$, YA$_1$'), and performing skew correction a times.

Figure 8B:
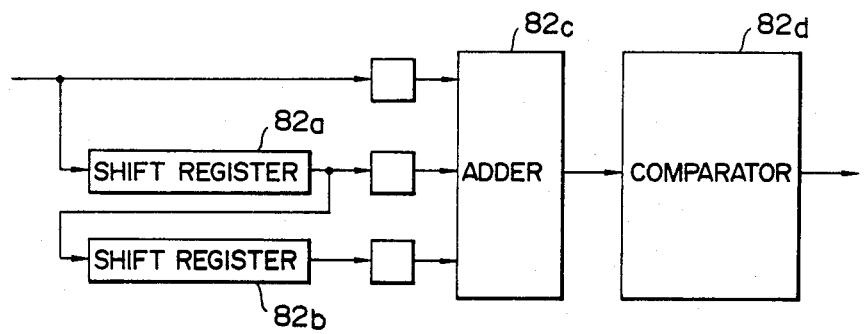

(3)-4 Block Diagrams for Frame Detector (i) Referring to FIGS. 8a and 8b, there are shown block diagrams for frame detection with respect to sampled long line segments in the main scanning direction.

In FIG. 8a, reference numeral 81 represents an X address counter in the direction of the X axis, which is caused to count up by an input clock.

Further, as shown in FIG. 8b, a majority logic circuit 82 comprises two shift registers 82a and 82b, an adder 82c and a comparator 82d. When, of three picture elements, two or more picture elements are black, the majority logic circuit 82 outputs 1. However, when, of the three picture elements, one picture element is black, or none of them is black, the majority logic circuit 82 outputs 0.

A white-to-black change detector 83 outputs an X address to an XS register 85 when the output of the majority logic circuit 82 changes from white to black, while a black-to-white change detector 84 outputs an X address to an XE register 86 when the output of the majority logic circuit 82 changes from black to white. The XS register 85 is a FIFO (First-In-First-Out) memory for storing the address XS of the current scanning line segment, and the XE register 86 is also a FIFO memory for storing the address XE of the current scanning line segment.

An XS' register 87 and an XE' register 88 are FIFO memories for respectively storing XS' and XE' which have a possibility of being integrated within the scanned picture.

In an integration determination element 89, XS, XE, XS' and XE' are successively read respectively from the XS register 85, the XE register 86, the XS' register 87 and the XE' register 88, and are compared with each other, so that it is determined whether or not the conditions for integration of line segments of the previously described algorithm are satisfied. When satisfied, the coordinates (XS', XE') of the integrated line segment are respectively stored in the XS' register 87 and in the XE' register 88. However, when XE−XS is smaller than l, such integration is ignored.

Among the sampled line segments (XS', XE') which have been scanned, when there is no line segment to be integrated with the currently scanned line segment (XS, XE), those line segments (XS', XE') are input to a line length determination element 90. On the other hand, among the currently scanned line segments (XS, XE), when there is no line segment to be integrated with the scanned line segment (XS', XE'), those currently scanned line segments (XS, XE) are input to the XS' register 87 and the XE' register 88.

A Y address counter 810 is a Y address counter in the direction of the Y axis, which is caused to count up by an input clock. The line length determination element 90 determines the length of a line segment from the XS and XE which are not be integrated and which are output from the integration determination element 89. If the length of the line segment is longer than the minimum length L$_{TH}$, (XS, XE, YA) is stored in a line segment memory 811.

(ii) Referring to FIG. 9, there is shown a block diagram for frame detection with respect to sampled long line segments in the subscanning direction.

In the figure, reference numeral 91 represents an X address counter in the direction of the X axis, which is caused to count up by an input clock. A majority logic circuit 92 comprises two shift registers 92a and 92b, an adder 92c and a comparator 92d. As in the case of the majority logic circuit 82, when, of three picture elements, two or more picture elements are black, the majority logic circuit 92 outputs 1. However, when, of the three picture elements, one picture element is black, or none of them is black, the majority logic circuit 92 outputs 0. The output of the majority logic circuit 92 is sequentially input to a shift register 93.

A line segment sampling element 94 reads the picture elements of the prior scanned line segment and the picture elements of the current scanned line segment from the shift register 93, and performs line segment sampling in accordance with the previously described algorithm of sampling of line segments in (3)-2.

a. When the watched picture element in the preceding scanning line segment is 0, and the watched picture element in the watched scanning line segment is 1 :
  YA is stored in the address XA of the YS memory 95.

b. When the watched picture element in the preceding scanning line segment is 1, and the watched picture in the watched scanning line segment is 0 :
  In both the preceding scanning line and the watched picture, if one of the picture elements on either side of each watched picture segment is 1, YS' is stored in the YS memory 95 at the address XA', where YS'=MIN(YS', YS). In other cases, YS and YE are output to a line length determination element 96, where YE=YA−1.

c. When the watched picture element in the preceding scanning line segment is 1, and the watched picture element in the watched scanning line segment is 1 :
  Nothing is done.

d. When the watched picture element in the preceding scanning line segment is 1, and the watched picture element in the watched scanning line segment is 1:
Nothing is done.

The line length determination element 96 reads the coordinates (YS, YE) of the line segment from the line segment sampling element 94. When YE−YS is greater than $L_{2TH}$, the line length determination element 96 outputs (YS, YE, XA) to a line segment sampling memory 97.

A line segment sampling memory 97, an integration line length determination element 99 and a line segment memory 910 perform integration of line segments in accordance with the previously described integration algorithm.

More specifically, the integration is performed as follows:

a. By a sorter 98, sampled line segments are aligned in the order of smaller X coordinates XA.

b. By the integration line length determination element 99, whether or not integration of line segments should be done is determined. When the integration is determined, the integration is done by the integration line length determination element 99. When the YE−YS is found to be more than $L_{2TH}$, the line segment is determined as a long line segment and is output to the line segment memory 910.

c. Thus, the line segment memory 910 stores the integrated long line segment therein.

A Y address counter 911 is an address counter in the direction of the Y axis and is caused to count up by line clocks input thereto.

Figure 10:
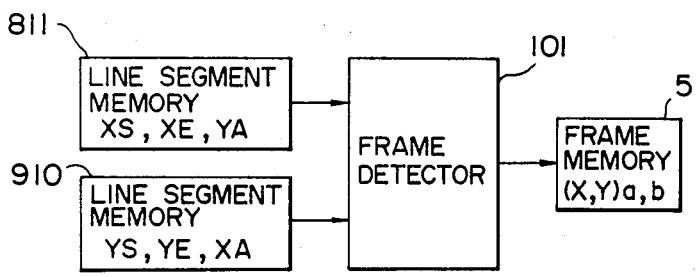

(iii) Referring to FIG. 10, there is shown a block diagram for frame detection.

Frame detection is performed within a frame detector 101 by a line segment memory 811 for the main scanning direction and by a line segment memory 910 for the subscanning direction, in accordance with the previously described algorithm. The frame detected by the frame detector 101 is input to the frame memory 5.

Figure 11:
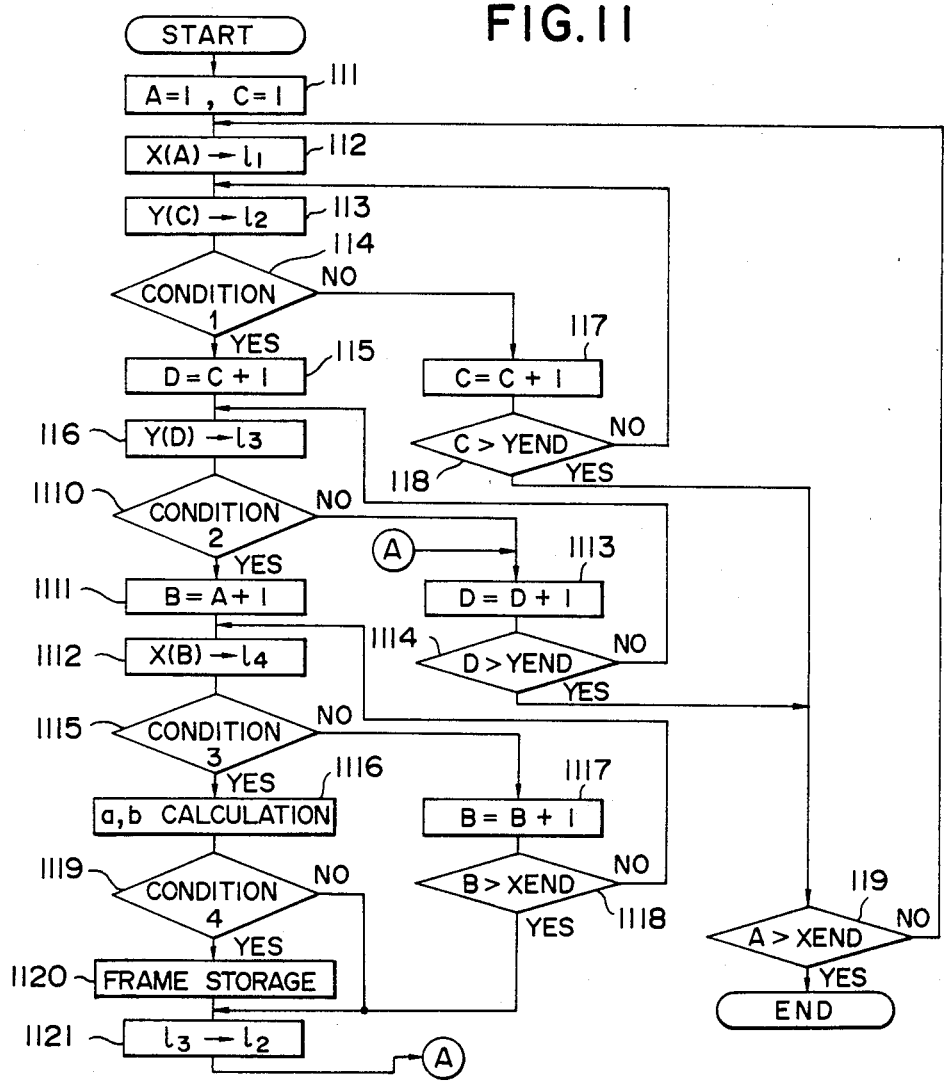
FIG. 11 is a flow chart indicating the processing process of the frame detector shown in FIGS. 8a and 8b, FIG. 9 and FIG. 10.

The flow of the frame processing by the frame detector 101 will now be explained in detail by referring to the flow chart in FIG. 11.

1 is substituted into variables A and C in a block 111, so that such an initialization is performed that a line segment X(A), which is the Ath line segment in the direction of X, is designated as $l_1$ (in block 112), and a line segment Y(C), which is the Cth line segment in the direction of Y, is designated as $l_2$ (in block 113).

First, in a block 114, whether or not the following condition 1 is satisfied is determined:

Condition 1: $YS_2 \leq YA_1+R$, $YE_2 > YA_1$, and $XA_2 \geq XS_1-R$

When the above condition is satisfied, C+1 is substituted into a variable D (in block 115), and the line segment, which is the Dth in the direction of Y, is designated as $l_3$ (in block 116).

When the above condition is not satisfied, 1 is added to the variable C (in block 117) and C is compared with the number of line segments in the Y direction, $Y_{END}$ (in block 118). When C does not exceed the number $Y_{END}$, the step is returned to the block 113. When C does exceed the number $Y_{END}$, the step moves onto a block 119.

Second, in a block 1110, whether or not the following condition 2 is satisfied is determined:

Condition 2: $YS_3 \leq YA_1+R$, $YE_3 > YA_1$, and $YA_3' \leq X-E_1+R$

When the above condition is satisfied, A+1 is substituted into a variable B (in block 1111), and the line segment, which is the Dth in the direction of Y, is designated as $l_4$ (in block 1112).

When the above condition is not satisfied, 1 is added to the variable D (in block 1113) and D is compared with the number of line segments in the direction of Y, $Y_{END}$ (in block 1114). When D does not exceed the number $Y_{END}$, the step is returned to the block 116. When C does exceed the number $Y_{END}$, the step moves onto the block 119.

Third, in a block 1115, whether or not the following condition 3 is satisfied is determined:

Condition 3: $YA_4' \leq YE_2+R$, $YA_4' \leq YE_3+R$, and $XS_4-R \leq XA_2$, $XA_3' \leq XE_4+R$ When the above condition is satisfied, the size of the frame, a, b, is calculated (in block 1116).

When the above condition is not satisfied, 1 is added to the variable B (in block 1117) and B is compared with the number of line segments in the direction of X, $X_{END}$ (in block 1118). When B does not exceed the number $X_{END}$, the step is returned to the block 1112. When B does exceed the number $X_{END}$, the step moves onto a block 1121.

Fourth, in a block 1119, whether or not the following condition 4 is satisfied is determined:

Condition 4: $a > 75$ and $b > 155$

When the above condition is satisfied, the frame information is stored in the frame memory 5 (in block 1120), and the line segment $l_3$ is designated as $l_2$ (in block 1121), and the step moves onto a block 1113.

When the above condition is not satisfied, the step moves onto the block 1121, without storing the frame information in the frame memory 5.

Further, in the block 119, a variable A is compared with the number of line segments in the direction of X. When A does not exceed the number $X_{END}$, the step is returned to the block 112, while when A does exceed the number $X_{END}$, the processing step is terminated.

As described above, in the present invention, when frame detection is done, it is necessary to sample comparatively long line segments accurately, without being affected by noise encountered during the process of sampling of long line segments.

Figure 12:
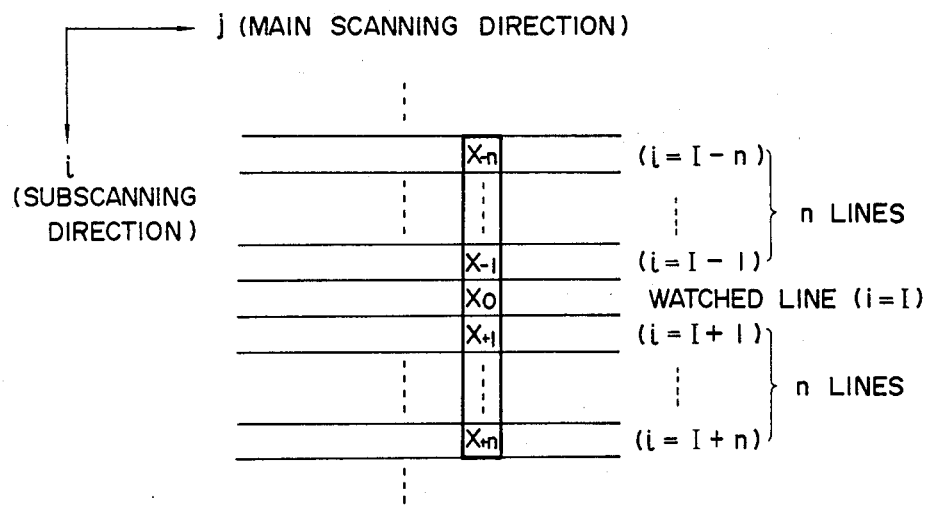
FIGS. 12 and 13 are schematic illustrations in explanation of sampling a line segment in the present invention.

Referring to FIG. 12, the method of sampling long line segments for frame detection, which has been explained above, will now be described in more detail. As a matter of course, that method can be applied to the sampling of long line segments both in the main scanning direction and in the subscanning direction.

(A) Sampling of Line Segments

In FIG. 12, j represents the main scanning direction and i represents the subscanning direction for binary picture elements to be processed. In the figure, for instance, let the line marked with (i=I) be a watched line. With respect to n reference lines above the watched line (i=I), that is, reference lines (i=I−1 to I−n), and with respect to n reference lines below the watched line (i=I), that is, reference lines (i=I+1 to I+n), the total number of black picture elements in the picture elements above and below the picture element $X_0$ in the watched line, in the subscanning direction, is calculated. In other words, of $(2n+1)$ picture elements, $X_{-n},..., X_{-1}, X_0, X_{+1}, ..., X_{+n}$, the total number of black picture elements is calculated.

When there are $(n+1)$ or more black picture elements, the picture element $X_0$ in the watched line is regarded as an effective black picture element. A section in the watched line in which such effective black picture elements are present continuously by the number of 1 or more is sampled as a line segment. The starting address (iS, jS) and the ending address (iE, jE) of the sampled line segment are determined.

Figure 13:
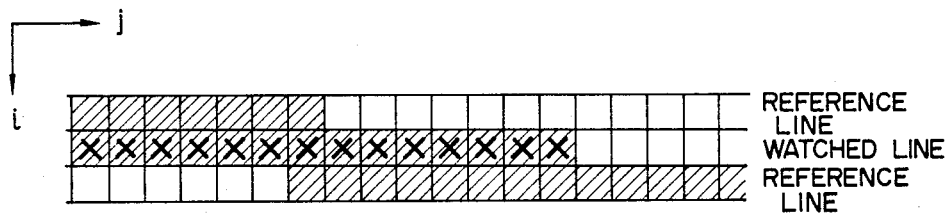

For instance, when $n=1$, there are two reference lines, one above the watched line and the other below the watched line as shown in FIG. 13. In the figure, blank boxes represent non-black picture elements, while shaded boxes represent black picture elements.

In the case as shown in the figure, the picture elements with X marks in the watched line are regarded as effective black picture elements. Sections in the watched line, in which there are 1 or more effective black picture elements continuously present, are sampled as the line segments. When $n=1$, l is selected in the range of 40 to 70. The greater the number n, the less susceptible to noise is the sampling of line segments.

(B) Integration of Sampled Line Segments

When a line segment sampled in the manner as described in (A) is present within the main scanning distance of m picture elements from another sampled line segment in the same line or in an adjacent line, the two line segments are integrated into one line segment.

Figure 14:
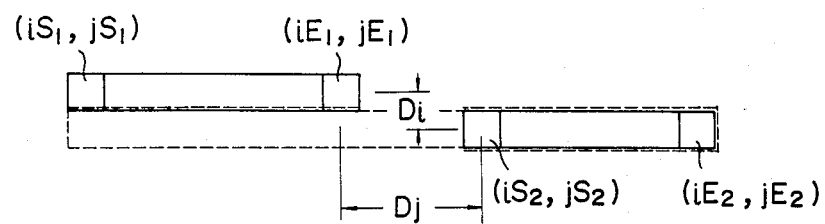
FIG. 14 is a schematic illustration in explanation of integration of sampled line segments in the present invention.

For instance, referring to FIG. 14, it is supposed that the starting address and the ending address of one sampled line segment $L_1$ are respectively $(iS_1, jS_1)$ and $(iE_1, jE_1)$, and the starting address and the ending address of another sampled line segment $L_2$ are respectively $(iS_2, jS_2)$ and $(iE_2, jE_2)$. When the distance $D_j$ in the main scanning direction between the ending address of the sampled line segment $L_1$ and the starting address of the sampled line segment $L_2$ is less than m, that is, when $D_j = |jS_2 - jE_1| > m$, the two line segments $L_1$ and $L_2$ are integrated into one line segment with the starting address $(iS_1, jS_1)$ and the ending address $(iE_2, jE_2)$. In the above, m is selected, for example, as 15. The distance in the subscanning direction between the two line segments $L_1$ and $L_2$ is not more than 1, that is, $D_i = |iS_2 - iS_1| \leq 1$.

When skewing of the two line segment $L_1$ and $L_2$ can be ignored, the staring address and the ending address of the integrated line segment can be respectively described as $(iS_2, jS_1)$ and $(iE_2, jE_1)$. The thus integrated line segment is shown by broke lines in FIG. 14.

The above-described line segment integration process is repeated until there are no longer any line segments, which can meet the above described integration conditions.

(C) Sampling of Long Line Segments

The main scanning length of each integrated line segment, which is measured by the number of picture elements, is compared with a predetermined minimum length. When the main scanning length is greater than the minimum length, that integrated line segment is sampled as a long line segment. The minimum length is selected in the range of approximately 100 to 200 by the number of picture elements.

Figure 15:
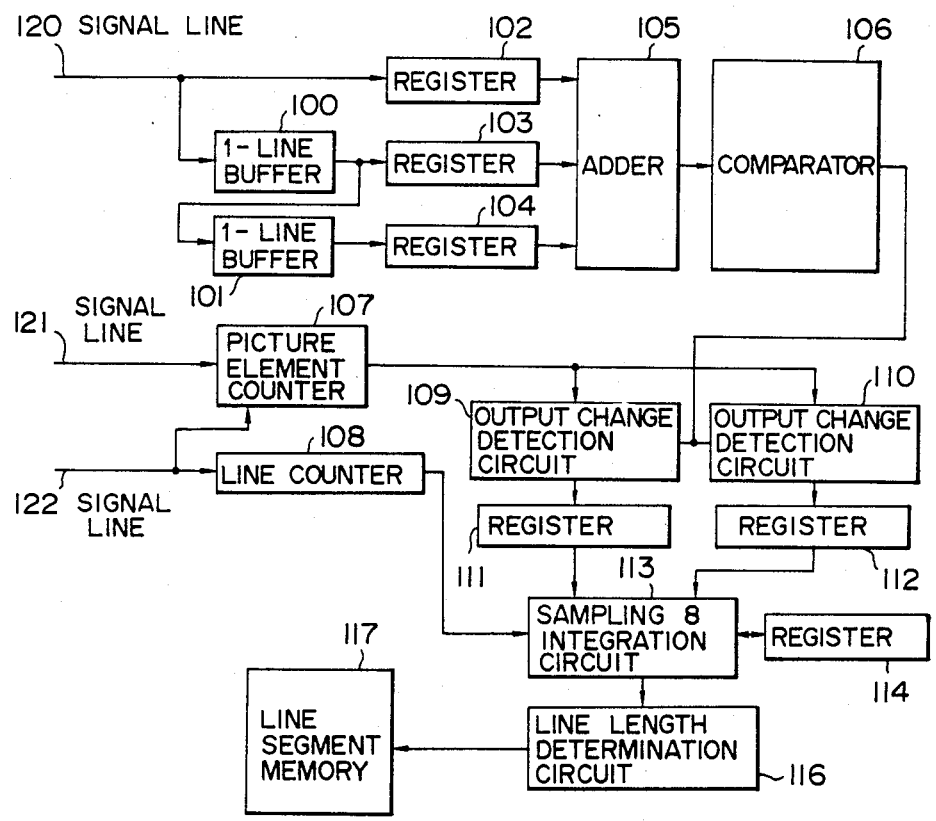
FIG. 15 is a block diagram of an example of an apparatus for sampling long line segments for use in the present invention.

The above described sampling of long line segments can be performed in real time by use of an apparatus as shown in FIG. 15.

A binary picture signal is input from a scanner (not shown) to the apparatus through a signal line 120. This picture signal is then input to a register 102 and to a one-line buffer 100. The one-line buffer 100 is a shift register capable of storing image signals for one line and capable of shifting the contents sequentially to the left with the timing of clocks for picture element transfer input to a line 121.

The output of the one-line buffer 100 is input to a register 103 and, at the same time, to a one-line buffer 103. The output from the one-line buffer 103 is input to a register 104. As a result, the latest picture element in the line which is currently scanned is input to the register 102, the picture element at the position corresponding to that of the latest above picture element in the watched line (which watched line is prior to the current scanning line) is input to the register 103, and the corresponding picture element in the further prior line which was scanned before the watched line is input to the register 104.

An adder 105 adds the density levels ("1" or "0") of the three picture elements in the registers 102, 103 and 104.

A comparator 106 outputs "1" when the output of the adder 105 is 2 or more, that is, when 2 or more picture elements are black, of the three picture elements. When the output of the adder 105 is 1 or 0, the comparator 106 outputs "0". In other words, when the watched picture element in the watched line is a black effective picture element, the comparator 106 outputs "1". Otherwise, the comparator 106 outputs "0".

As mentioned previously, picture element transmission clocks are input to the signal line 121 with the picture element transfer timing of a scanner (not shown), and a picture element counter 107 counts the picture element transmission clocks, whereby the addresses (i) in the main scanning direction of the picture elements input to the registers 102 through 104 are determined.

At the initiation of scanning of each line, a line clock is input to the signal line 122. At the arrival of each line clock, the picture element counter 107 is reset. A line counter 108 counts line clocks and determines the number of the currently scanned line (or the watched line), that is, the addresses (j) in the subscanning direction, and input the determined addresses (j) in the subscanning direction to a sampling & intergration circuit 113.

When an output change detection circuit 109 detects the change in the output of the comparator 106 from "0" to "1", the output change detection circuit 109 causes the output from the picture element counter 107 at that time to be stored in a register 111.

On the other hand, when the output of the comparator 106 changes from "1" to "0", another output change detection circuit 110 causes the output of the picture element counter 107 to be stored in a register 112. As a result, the starting address and ending address of each section in which effective black picture elements are continuous, that is, (jS) and (jE), can be obtained by the registers 111 and 112.

The sampling & integration circuit 113 samples as line segments sections in which effective black picture elements are continuous by the number of 1 or more, in accordance with the address information in the direction of the main scanning direction provided by the registers 111 and 112 and the address information in the direction of the subscanning direction provided by the line counter 108. When there are line segments which can be integrated with the currently scanned line segment by referring to the contents of a register 114, the sampling & integration circuit 113 integrates those line segments and updates the starting address and ending address of the integrated line segments stored in the register 114. When there are no line segments to be integrated, the sampling & integration circuit 113 inputs the so far detected starting address and ending address to the register 114. After completion of such interation, the starting address and ending address of each line segment are sequentially output from the sampling & integration circuit 113.

A line length determination circuit 116 compares the length of each line segment integrated by the sampling & integration circuit 113 with a predetermined minimum length, and, when the length of the integrated line segment exceeds that minimum length, the integrated line segment is regarded as a long line segment and its starting address and ending address are stored in a line segment memory 117. When the integrated line segment is less than the minimum length, the information about the integrated line segment is discarded.

In the above, the sampling and integration of line segments in the main scanning direction have been described. As a matter of course, the above procedure can be applied to the sampling and integration of line segments in the subscanning direction as well.

In the case where there is provided a buffer memory capable of storing picture signals for one frame of a picture, sampling of long line segments in the subscanning direction can be performed by switching the scanning direction in the buffer memory from the main scanning direction to the subscanning direction and inputting the read-picture signals to the apparatus shown in FIG. 4. In this case, however, it is necessary to change the scanning direction of the starting address and ending address of the long line segment obtained in the line segment memory 117 to the appropriate scanning direction, since the switching of scanning direction from the main scanning direction to the subscanning direction has been done. As a matter of course, an apparatus capable of sampling the line segments both in the main scanning direction and subscanning direction in real time can also be set up by use of the above described line segment sampling and integration method.

A specific example of a frame detection method by use of the above described line segment sampling and integration method will now be explained.

It is supposed that a line segment $l_1$ in the main scanning direction is sampled by the above described method and the starting address and the ending address of the line segment $l_1$ are respectively $(iS_1, jS_1)$ and $(iE_1, jE_1)$.

When the line segment $l_1$ is the upper side in the main scanning direction of a frame, there should be a pair of line segments $l_2$ and $l_3$, corresponding to the both sides of the frame, which line segments extend in the subscanning direction, crossing the upper line segment or each having a starting address within a distance k from the upper line segment. At which sides the pair of line segments $l_2$ and $l_3$ exist can be determined from the following conditions:

$$iS_2 \leq MAX(iS_1, iE_1) + k$$

$$iS_3 \leq MAX(iS_1, iE_1) + k$$

$$iE_2 > MAX(iS_1, iE_1)$$

$$iS_1 - k \leq MAX(jS_2, jE_2)$$

$$jE_1 + k \geq MAX(jS_3, jE_3)$$

where the starting address and the ending address of the line segment $l_2$ are $(iS_2, jS_2)$ and $(iE_2, jE_2)$, and the starting address and the ending address of the line segment $l_3$ are $(iS_3, jS_3)$ and $(iE_3, jE_3)$.

If the above conditions are satisfied, it is determined that the line segment $l_2$ is on the left side, while the line segment $l_3$ is on the right side. In this case, as a matter of course, the line segments $l_2$ and $l_3$ are positioned below the line segment $l_1$ and the line segment $l_2$ is positioned on the left side of the line segment $l_3$. k is selected, for example, as 15.

When there exist the line segments $l_2$ and $l_3$ which satisfy the above described conditions, a line segment which corresponds to the lower side of the frame is then looked for. If there exists a line segment $l_4$ corresponding to the lower side of the frame, it should cross the two line segments $l_2$ and $l_3$ or should be located within a distance k from the two line segments $l_2$ and $l_3$.

When the line segment $l_4$ satisfies the following conditions, the line segment $l_4$ is determined to correspond to the lower side of the frame:

$$MIN(iS_4, iE_4) \leq iE_2 + k$$

$$MIN(iS_4, iE_4) \leq iE_3 + k$$

$$jS_4 - k \leq MAX(jS_2, jE_2)$$

$$jE_4 + k \geq MIN(jS_3, jE_3)$$

In the above case, the line segment $l_4$ is positioned below the line segment $l_1$.

In accordance with the above procedure, the line segments $l_1$ and $l_4$ in the main scanning direction, corresponding to the upper side and the lower side of the frame, and the line segments $l_2$ and $l_3$ in the subscanning direction, corresponding to both sides of the frame, can be detected and accordingly the area within the frame is detected as the picture area.

What is claimed is:

1. A picture processing apparatus comprising;
   a picture memory for storing a quantized picture of an original, which original includes skew detection marks;
   a skew detector for detecting the skew of the quantized picture by the skew detection marks on the original;
   a frame detector for detecting the frame in which the picture on the original is enclosed;
   a picture-processing area designation apparatus for designating the portion of the picture to be processed and edited in accordance with the frame detection information obtained from said frame detector;
   and a skew corrector for reproducing the quantized picture within the area designated by said picture-processing area designation apparatus, with correction of skew, if any, from said picture memory.

2. A picture processing apparatus as claimed in claim 1, further comprising a skew mode selection switch for said skew corrector for selecting whether or not said skew correction shall be performed.

3. A picture processing apparatus as claimed in claim 1, wherein said frame detector comprises a line segment sampling circuit, a line segment integration circuit, and a line segment length determination circuit.

4. A picture processing apparatus as claimed in claim 1, wherein said skew detection marks comprise at least two marks with reference points $M_1(x_1, y_1)$ and $M_2(x_2, y_2)$, said marks being solid and triangular in shape, and said skew detector comprising an $M_1$ address counter and an $M_2$ address counter.

* * * * *